United States Patent
Underwood et al.

(10) Patent No.: US 10,044,626 B2
(45) Date of Patent: Aug. 7, 2018

(54) RELIABLE OUT-OF ORDER END-TO-END PROTOCOL WITH ROBUST WINDOW STATE OVERFLOW MANAGEMENT AND A MULTI-NODE SYSTEM USING SAME

(71) Applicant: Intel Corporation, Santa Clara, CA (US)

(72) Inventors: Keith Underwood, Powell, TN (US);
Charles Giefer, Seattle, WA (US);
Mark Debbage, Santa Clara, CA (US);
Karl P. Brummel, Chicago, IL (US);
Nathan Miller, Seattle, WA (US);
Bruce Pirie, Renton, WA (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 14/757,993

(22) Filed: Dec. 24, 2015

(65) Prior Publication Data
US 2017/0187637 A1    Jun. 29, 2017

(51) Int. Cl.
*H04L 12/801* (2013.01)
*H04L 12/807* (2013.01)
(Continued)

(52) U.S. Cl.
CPC ........... *H04L 47/34* (2013.01); *H04L 1/1621* (2013.01); *H04L 1/1635* (2013.01); *H04L 1/187* (2013.01);
(Continued)

(58) Field of Classification Search
CPC . H04L 1/08–1/1896; H04L 12/1863–12/1877; H04L 47/10–47/808; H04L 69/16–69/169
See application file for complete search history.

(56) References Cited

U.S. PATENT DOCUMENTS 5,222,061 A * 6/1993 Doshi .................. H04L 1/1628
370/394
7,630,305 B2 * 12/2009 Samuels .................. H04L 1/16
370/229

(Continued)

FOREIGN PATENT DOCUMENTS

EP    2290904 A1    3/2011

OTHER PUBLICATIONS

International Search Report and Written Opinion issued in PCT Application No. PCT/US2016/063783, dated Apr. 28, 2017, 16 pages.

*Primary Examiner* — Timothy J Weidner
(74) *Attorney, Agent, or Firm* — Grossman, Tucker, Perreault & Pfleger, PLLC

(57) ABSTRACT

In an embodiment, an out-of-order, reliable, end-to-end protocol is provided that can enable direct user-level data placement and atomic operations between nodes of a multi-node network. The protocol may be optimized for low-loss environments such as High Performance Computing (HPC) applications, and may enable loss detection and de-duplication of packets through the use of a robust window state manager at a target node. A multi-node network implementing the protocol may have increased system reliability, packet throughput, and increased tolerance for adaptively routed traffic, while still allowing atomic operations to be idempotently applied directly to a user memory location.

18 Claims, 10 Drawing Sheets

(51) Int. Cl.
*H04L 12/869* (2013.01)
*H04L 1/16* (2006.01)
*H04L 1/18* (2006.01)
*H04L 29/06* (2006.01)

(52) U.S. Cl.
CPC ............ *H04L 1/1832* (2013.01); *H04L 47/18* (2013.01); *H04L 47/27* (2013.01); *H04L 47/58* (2013.01); *H04L 69/22* (2013.01)

(56) References Cited

U.S. PATENT DOCUMENTS

| | | |
|---|---|---|
| 8,923,129 B1 | 12/2014 | Yuan et al. |
| 2007/0299963 A1 | 12/2007 | DeCusatis et al. |
| 2011/0103403 A1 | 5/2011 | Derom et al. |
| 2012/0257617 A1 | 10/2012 | Bugenhagen et al. |

\* cited by examiner

RELIABLE OUT-OF ORDER END-TO-END PROTOCOL WITH ROBUST WINDOW STATE OVERFLOW MANAGEMENT AND A MULTI-NODE SYSTEM USING SAME

GOVERNMENT RIGHTS

This invention was made with Government support under contract number H98230-13-D-0124, awarded by the Department of Defense. The Government has certain rights in this invention.

FIELD

The present disclosure is generally directed to communication between nodes of a multi-node network, and more particularly, to an end-to-end protocol allowing for reliable, out-of-order reception of packets using robust window state overflow management.

BACKGROUND

The use of a large number of multi-core processors combined with centralization techniques continue to increase in popularity for applications that feature computationally intensive tasks. For example, systems implemented with a large number of compute nodes disposed in proximity to each other, and coupled via high-speed interconnects, are particularly well suited for applications such as quantum mechanics, weather forecasting, climate research, oil and gas exploration, and molecular modeling, just to name a few. These multi-node systems may provide processing capacity many orders of magnitude greater than that of a single computer. This gap grows exponentially each year. For example, some multi-node systems have processing capacity (generally rated by floating point operations per second (FLOP)), in the petaflops range.

This pursuit of increased performance has led to approaches including massively parallel systems featuring a large number of compute nodes, with each node providing one or more processors, memory, and an interface circuit connecting the node to a multi-node network. In so-called "fabric" network configurations, wherein each node has potentially N number of paths to other nodes of the multi-node network, a sequence of contiguous packets may ultimately take different paths between an initiating node and a target node. Thus the target node may receive a predominately out-of-order sequence of packets. Out-of-order reception of packets poses one non-trivial challenge in the design of multi-node systems.

Figure 1:
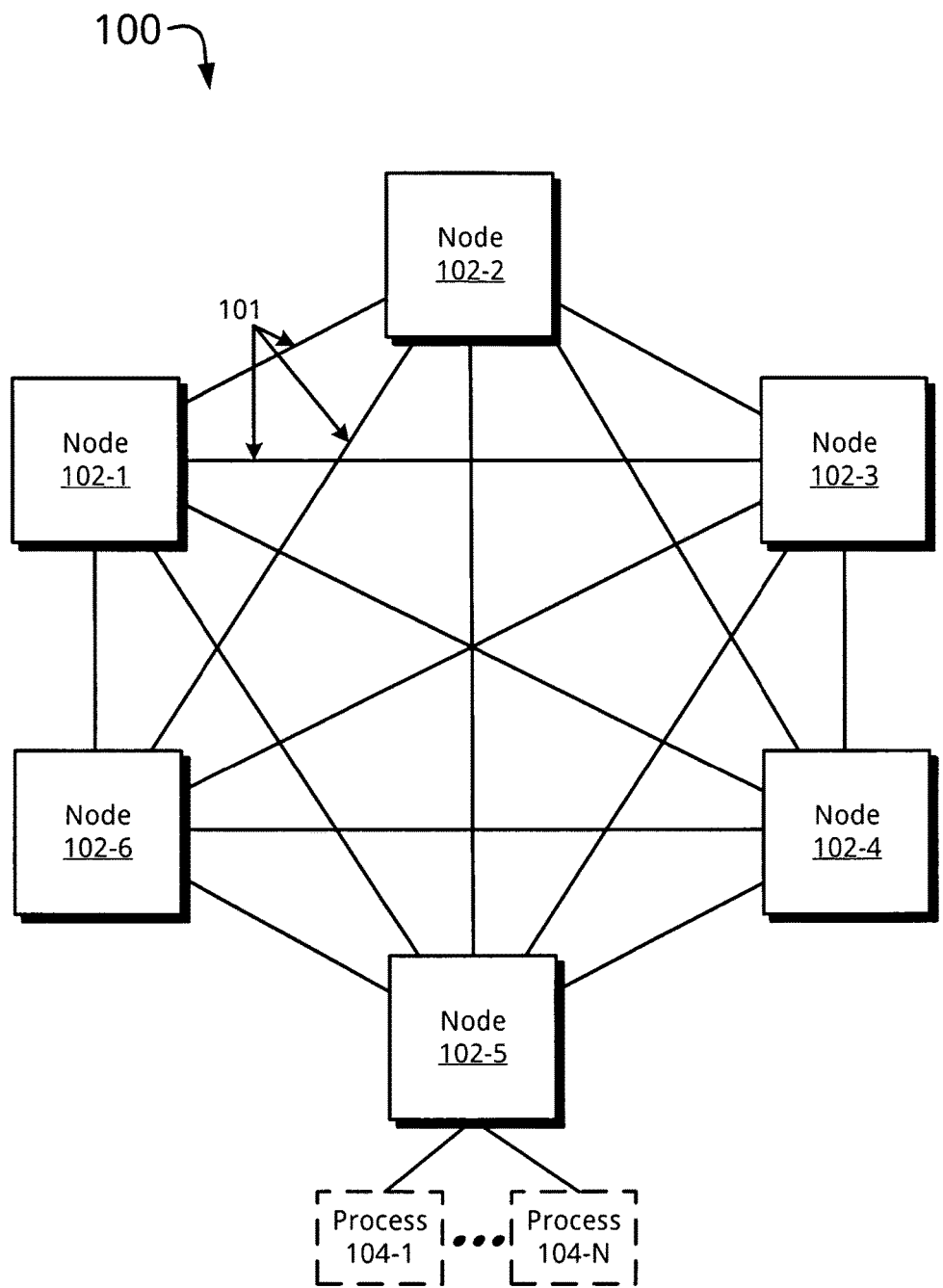
FIG. 1 is a block diagram of an example multi-node network having a plurality of interconnected nodes, in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

High Performance Computing (HPC) applications may be implemented across a number of inter-connected nodes. The inter-connected nodes may form a so-called "fabric" whereby each node is communicatively coupled to every other node via a network. In an embodiment, inter-node communication may occur during performance of an HPC application. Inter-node communication may include an initiating node sending a sequence of packets to a target node. The sequence of packets may be associated with, for example, gets or sets which seek to read or write to memory associated with the target node. The initiating node must ensure that each packet was successfully received by the target node. On the other hand, the target node must ensure that each packet is received and applied only once. For example, memory operations such as atomic operations are intended to be performed once, with any subsequent attempt to effect the same operation being idempotently applied.

However, multi-node networks can feature large numbers of nodes, and in some cases, configurations including up to one (1) million nodes, or more. To ensure packets are transmitted and received efficiently between nodes, adaptive routing may be implemented to route packets around network congestion or otherwise via a path that mitigates latencies. Adaptive routing can result in a sequence of packets taking a number of different paths to a same target node, which may result in out-of-order packet reception at a target node. Programming model implementations that require reliable packet delivery generally disable or otherwise limit adaptive routing to avoid tracking a potentially large number of packets by both an initiating node and a target node. For example, some approaches may be synchronized on a per-packet basis whereby each packet sent by an initiating node is acknowledged by a target node prior to the initiating node transmitting a next packet in a sequence of packets.

Thus, in accordance with an embodiment of the present disclosure, an out-of-order, reliable, end-to-end protocol is provided that can enable direct user-level data placement and atomic operations. The protocol may be optimized for low-loss environments such as High Performance Computing (HPC) applications, and may enable loss detection and detection of duplicate packets. A multi-node network implementing the protocol may have increased system reliability and increased tolerance for adaptively routed traffic, while still allowing atomic operations to be idempotently applied directly to a user memory location. In an embodiment, a window-based tracking scheme may be implemented by an initiating node and a target node during end-to-end communication such that a stream of packets that is contiguous in an overall packet sequence number (PSN) space is adaptively routed to, and applied by, a target node without the initiating node necessarily tracking packet transmission states at a per-packet, fine-grain level. Instead, the window-based tracking scheme allows the target node to track individual packet arrival within a predefined window of contiguous packet sequence numbers relative to the overall PSN space. Stated differently, the target node may use the predefined window to track a subset of contiguous sequence numbers corresponding to packets that are expected to arrive. Therefore, individual packet arrival is tracked as a combination of a most-recently received packet in a stream of packets that is contiguous in the PSN space, and a finite number of packets received in the window past the last contiguous packet. The target node may then periodically inform the initiating node of the PSN of the contiguously received packet that is furthest along in the PSN space, and also may inform the initiating node of a window size in terms of a maximum distance allowed between that packet furthest along in the PSN and a next packet to be sent. At the same time, the target node may then "shift" the window relative to the received packet furthest along in the PSN space in order to track additional expected packets from the target node. On the other hand, and in accordance with the received maximum window size, the initiating node ensures never to transmit a packet with a sequence number that exceeds the maximum distance/window size. As the initiating node is informed of a packet furthest along in the PSN space received by the target node, the initiating node may then also shift its window relative to that packet to transmit the additional expected packets to the target node. Thus the initiating node may track packet transmission states at a coarse-grain level based on cumulative updates from the target node.

In further detail, a node initiates communication with a target node by requesting a connection. In response, the target node may send back to the initiating node one or more parameters for the connection such as a sequence number and a predefined window size. This stage may be accurately referred to as a connection initialization stage. The initiating node may then transmit a sequence of packets with the first packet bearing the sequence number, and subsequent packets incrementing the sequence number accordingly. This stage may be accurately referred to as a packet sequencing or transmission stage. The initiating node may comport with the predefined window size by limiting a distance D between the sequence number of the first packet and a sequence number of the next packet to be sent. The distance D may manifest as a maximum sequence number (MaxSeqNum) whereby an initiating node does not send packets with a sequence number beyond the MaxSeqNum. For example, a window size of 10 and a starting sequence number of 0 may result in the initiating node sending a sequence of packets with sequence numbers 0 . . . 9. Once the MaxSeqNum is reached, the initiating node temporarily suspends further packet transmissions to the target node until an acknowledgement packet indicates the packets were successfully received by the target node.

On the other hand, the target node receives each of the sequence of packets and updates a window state accordingly. The target node tracks each individual received packet with respect to both an overall contiguous stream of packets within a packet sequence number (PSN) space, and a predefined (or finite) number of packets received in a window past that last contiguous packet. The target node may acknowledge each received packet from the initiating node, or may cumulatively acknowledged a number of packets. In some cases, the target node may periodically send an indicator such as a special acknowledgement packet to the initiating node, with the special acknowledgement packet informing the initiating node of the PSN of the contiguously received packet that is furthest along in the PSN space (e.g., the furthest contiguous received sequence number). Once the target node determines that a predetermined number N of consecutive packets were received relative to the beginning of the window (e.g., the earliest sequence number within the finite number of sequence numbers tracked by the window), the target node may then "shift" the window to the right to track additional consecutive sequence numbers within the overall PSN space. In some cases, the predetermined number N of consecutive packets is at least one (1), although for the sake of performance, the predetermined number N may be any number up to and including the overall window size. Thus the target node may track the state of received packets and periodically report the state to the initiating node via a special acknowledgement packet, which may advantageously allow the initiating node to be informed at a course-grain level that a number of consecutive packets were received without having to monitor the state of each individual transmitted/in-flight packet. The initiating node may also use the special acknowledgement packet to identify, for example, a packet has stalled the target node from advancing past a particular packet position within the window. In an embodiment, the target node executes one or more memory operations (e.g., gets/sets) associated with a given packet once the given packet is received. In some cases, the executed memory operations may cause changes to be immediately available in user-memory.

As should be appreciated, the protocol disclosed herein provides numerous advantages over other approaches. For example, the protocol allows multi-node networks to take advantage of adaptive routing without losing reliability between endpoints. In addition, an initiating node and a target node may dynamically agree on connection characteristics based on an initialization stage that establishes a rolling or shifting window, which may allow the initiating node to transmit a number of packets without necessarily waiting for an acknowledgement that each packet was received. The target node may maintain a packet transmission state for each packet by tracking a finite number of packets, and reordering them accordingly within an overall contiguous PSN space, thus efficiently eliminating duplicates and allowing for detection of packet loss. Thus the initiating node may conserve node resources by not necessarily tracking packet transmission states at a fine-grain level; and instead, use periodic special acknowledgements from the target node to determine a present window state. Hardware of a node, such as a network interface circuit, may directly perform memory operations associated with the received packets. The memory changes may thus advantageously become available in user-memory space without the resource costs associated with other protocol approaches.

While specific references are made to HPC applications, this disclosure is not intended to be limited in this regard. For example, nodes may comprise standard computer systems, such as server computers commercially available for non-HPC applications (e.g., data storage, email servers, domain controllers, etc.). Thus, the multi-node network may not necessarily comprise a so-called "super computer" configured with ultra-high performance computing nodes. In addition, both general-purpose data center applications and specific-purpose data center applications are within the scope of this disclosure. For example, general-purpose data centers generally include infrastructure that supports a single business with a broad variety of applications, or an information technology (IT) service provider servicing many customers. On the other hand, specific-purpose data centers generally include university and military research, scientific laboratories, financial institutions, and search engine providers, just to name a few. Specific-purpose data centers generally implement specific usage patterns and are well suited for highly-scalable architecture that is tailored for a single or otherwise limited number of purposes. In any such cases, the protocol for providing out-of-order, end-to-end reliability disclosed herein is equally applicable to both general-purpose and specific-purpose data center applications.

Now referring to the figures, FIG. 1 shows a multi-node network 100 in accordance with an embodiment of the present disclosure. As shown, each of the nodes 102-1 to 102-6 are communicatively coupled to each other via paths 101 or links. The multi-node network 100 may also be accurately referred to as a fabric system having an all-to-all configuration whereby each node has a node path to all other nodes. As should be appreciated, the multi-node network 100 is illustrated in a highly simplified form. Other node topologies are within the scope of this disclosure and the example embodiment of FIG. 1 is not intended to be limiting. The multi-node network 100 may include N number of nodes and is not necessarily limited to six nodes, as shown. For example, the multi-node network 100 may include up to 1 million nodes, or more, depending on a desired configuration.

In an embodiment, each of the paths 101 may include associated networking switching equipment such as network switches, routers, and other high-speed interconnects. For example, the paths 101 may form a switched-fabric or switching-fabric network topology in which each node is communicatively coupled to the multi-node network 100 via one or more network switches. Alternatively, or in addition to switched-fabric, one or more paths may also physically manifest as a data bus, such as a PCI Express data bus or a proprietary data bus implemented by, for example, a backplane that couples two or more nodes. In one specific example not meant to limit the present disclosure, one or more of the paths 101 may comprise high-bandwidth interconnects such as 10 Gigabit InfiniBand interconnects. In any event, the multi-node network 100 may spread network traffic across multiple physical links represented by each of paths 101, which may yield throughput that exceeds that of other network approaches, such as broadcast networks implementing Ethernet.

Figure 9:
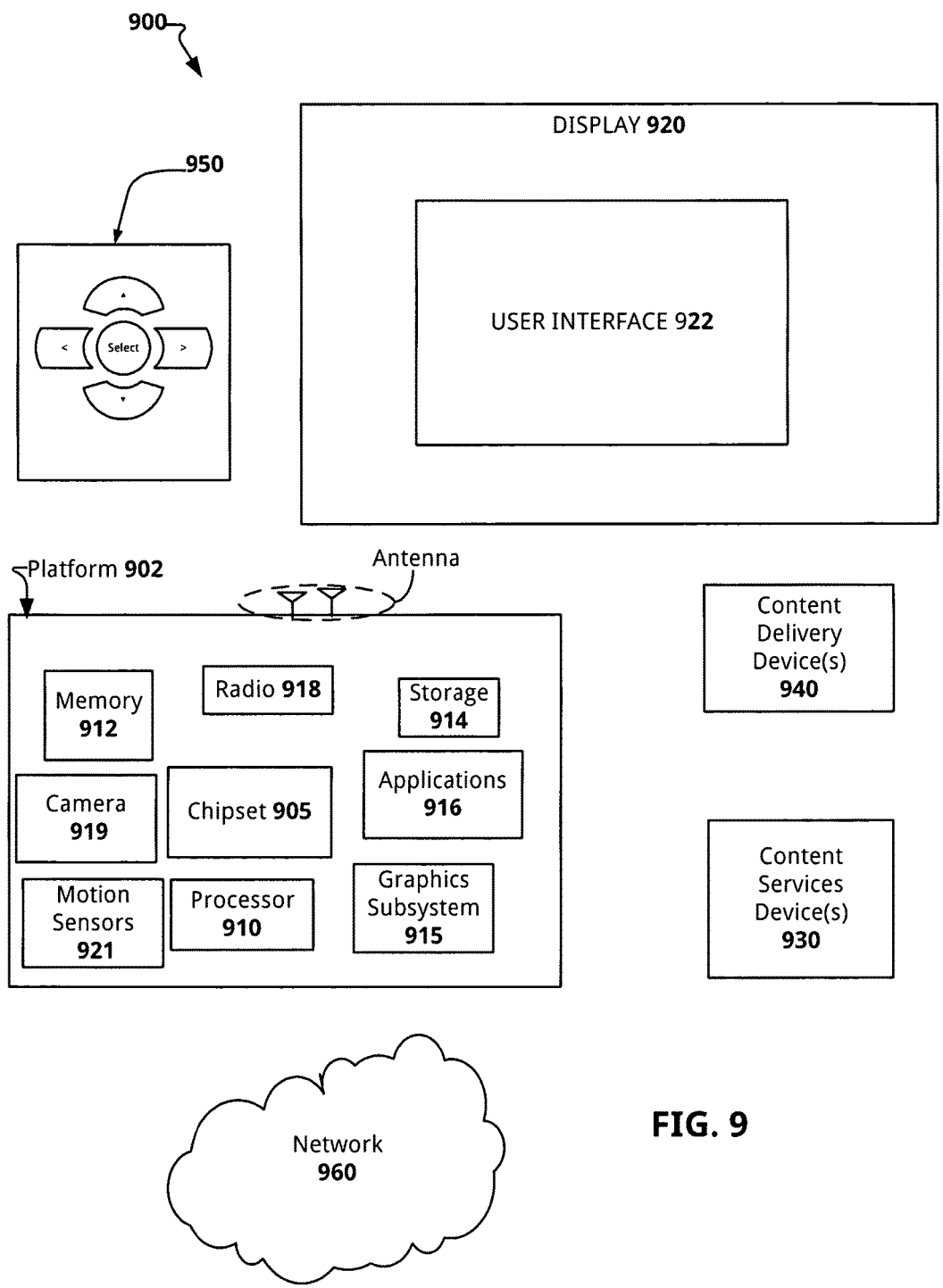
FIG. 9 illustrates a computer system configured to perform various processes disclosed herein, in accordance with an example embodiment of the present disclosure.

In an embodiment, each of the nodes 102-1 to 102-6 may comprise a computing system, such as the computing system 900 of FIG. 9. Each of the nodes 102-1 to 102-6 may comprise the same hardware and operating system, although different operating systems may be used on each node, and/or on different hardware. In some cases, one or more nodes may comprise a single-board or small form-factor (SFF) compute device enabling high-density applications. For example, datacenters may choose these types of compute nodes to maximize or otherwise increase the ratio of processors/cores per rack unit (U) of rack space.

Figure 2:
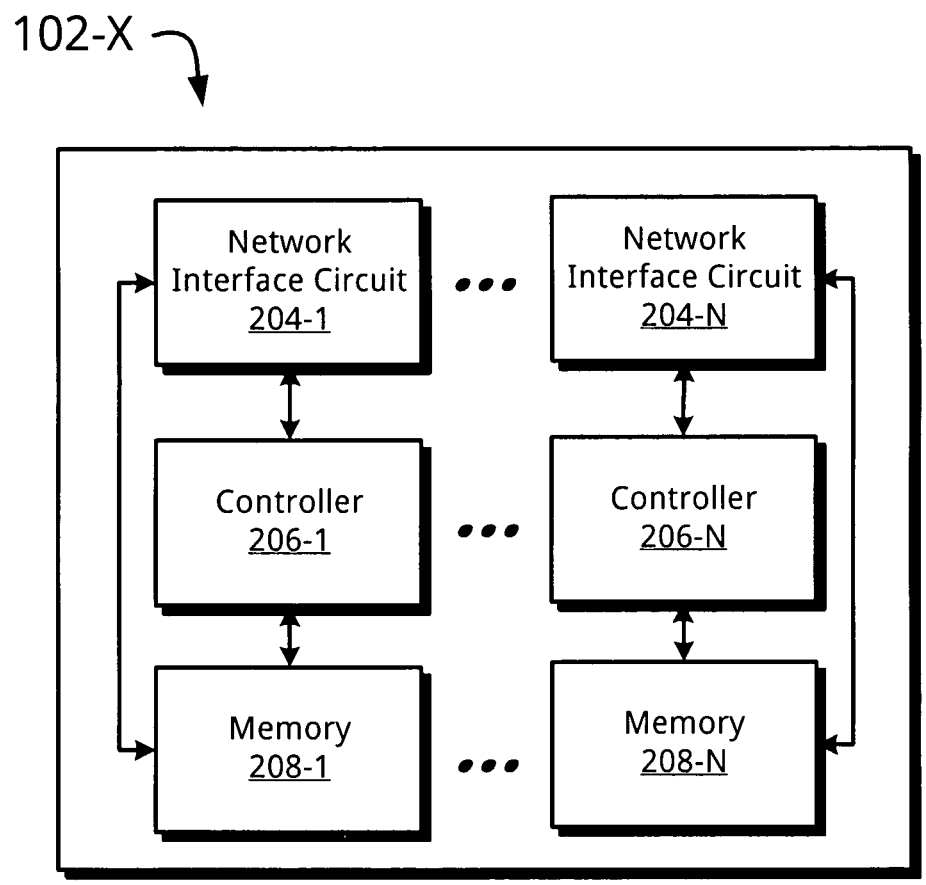
FIG. 2 is a block diagram of one example node of the multi-node network of FIG. 1, in accordance with an embodiment of the present disclosure.

Referring to FIG. 2, a block diagram illustrates an example node 102-X compatible for use as a node of the multi-node network 100 of FIG. 1, in accordance with an embodiment of the present disclosure. As shown, the example node 102-X comprises at least one network interface circuit 204-1 to 204-N, controller 206-1 to 206-N, and memory device 208-1 to 208-N. In an embodiment, the example node 102-X comprises a single system-on-chip (SoC) device, although other embodiments are within the scope of this disclosure. For example, each component of the example node 102-X may comprise a separate chip.

In more detail, each network interface circuit 204-1 to 204-N may be communicatively coupled to a respective one of controllers 206-1 to 206-N, and to a respective one of memory devices 208-1 to 208-N. The network interface circuits 204-1 to 204-N may each comprise hardware, software, or both, configured to transmit and receive signals using various communication techniques. For example, each network interface circuit 204-1 to 204-N may be configured to provide electrical signaling, optical signaling, or both, between nodes of the multi-node network 100. In any such cases, each network interface circuit 204-1 to 204-N may be configured to provide a plurality of bi-directional network ports with up/down speeds of at least 4.7 to 5.25 gigabytes (GB) per port, for example, although other link speeds are within the scope of this disclosure.

Each of the network interface circuits 204-1 to 204-N may include at least one processing device/circuit (not shown) such as, for example, a field-programmable gate array (FPGA), Reduced Instruction Set Computer (RISC) processor, x86 instruction set processor, microcontroller, an application-specific integrated circuit (ASIC). To this end, each of the network interface circuits 204-1 to 204-N may be configured to execute a plurality of instructions to carry out processes in accordance with various aspects and embodiments disclosed herein. For example, the processing device of the network interface circuit may be configured to execute the methods of FIGS. 3A, 4 and 8. These processes may be may be implemented, for example, using software (e.g., C or C++ executing on the controller/processor), hardware (e.g., hardcoded gate level logic or purpose-built silicon) or firmware (e.g., embedded routines executing on a microcontroller), or any combination thereof. Each of the network interface circuits 204-1 to 204-N may also be accurately referred to as host-fabric interfaces (HFIs).

As shown, each of the network interface circuits 204-1 to 204-N communicatively couples to a respective one of controllers 206-1 to 206-N, and to a respective one of the memory devices 208-1 to 208-N. In an embodiment, this coupling may physically manifest as a high-speed serial data bus, such as a PCI-E serial bus, although numerous other communication techniques should be apparent in light of this disclosure. As discussed further below, each network interface circuit 204-1 to 204-N may be configured to perform direct memory access (DMA) on an associated memory device.

As should be appreciated, each of the network interface circuits 204-1 to 204-N may be optionally coupled directly or indirectly to each other for intra-node communication. For example, each of the network interface circuits 204-1 to 204-N may be directly coupled to each other such that intra-node messages are routed without utilizing fabric hardware (e.g., network switches, routers, and so on) of the multi-node network 100. On the other hand, each of the network interface circuits 204-1 to 204-N may be indirectly coupled to each other using a router device (not shown), which may intelligently direct intra-communications of the example node 102-X to an appropriate network interface circuit.

Each controller 206-1 may include at least one processing device/circuit, but other embodiments are also within the scope of this disclosure. For example, each controller 206-1 may comprise at least two processing devices. Some example processing devices include, for example, a Complex Instruction Set Computer (CISC), a field-programmable gate array (FPGA), Reduced Instruction Set Computer (RISC) processor, x86 instruction set processor, microcontroller, an application-specific integrated circuit (ASIC), a graphics processing unit (GPU), or central processing unit (CPU). In some cases, each processing device provides at least one processing core. For example, and in accordance with an embodiment, each processing device may comprise a multi-core processor configured to provide at least 16 processing cores. In some cases, each of the controllers 206-1 to 206-N is configured with the same hardware, although other embodiments are also within the scope of this disclosure. In any event, each of the controllers 206-1 to 206-N may include or otherwise receive instructions that when executed cause one or more processes to be carried out, such as processes comprising the methods of FIGS. 3A, 4 and 8.

Each memory device 208-1 to 208-N may comprise, for example, a non-volatile storage device including flash memory and/or volatile storage devices such as Random Access Memory (RAM), Dynamic Random Access Memory (DRAM), and Static Ram (SRAM).

Returning to FIG. 1, the nodes 102-1 to 102-6 of the multi-node network 100 may be configured to execute distributed memory applications (or parallel applications) that comport with Message Passing Interface (MPI), Shared Memory Access (OpenSHMEM), and Partitioned Global Address Space (PGAS) programming models, although other models are also within the scope of this disclosure. To this end, and in accordance with an embodiment, each of the nodes 102-1 to 102-6 may collectively execute one or more parallel applications in accordance with these programming models. In some cases, each processor device of nodes 102-1 to 102-6, and more particularly, each core provided thereby, may provide a process which is uniquely identifiable and addressable within the multi-node network 100. For example, and as shown, the node 102-5 may provide processes 104-1 to 104-N, with each process being executed by a dedicated processor core.

The multi-node network 100 may provide a dynamic allocation of computing resources such that a parallel application may be executed across M nodes and N processes/cores, with the particular number of nodes and processes being allocated based on the particular implementation of the parallel application. For example, a parallel application may request a particular number of desired processes to perform a desired set of computations. In response, the multi-node network 100 may assign a contiguous or non-contiguous range of nodes and associated processes to each parallel application. In some cases, the multi-node network 100 may simultaneously support a plurality of such parallel applications, with each of the executed parallel applications having a pool of privately allocated resources.

During runtime of a given parallel application, the multi-node network 100 may provide cache coherence such that shared resource data is consistent amongst of a plurality of memory devices which caches the same. In a general sense, cache coherence can provide a protective mechanism that prevents cache data being in an invalid state or otherwise in conflict when two or more nodes/processes are operating on a same piece of data. In one particular example embodiment, the multi-node network 100 at least partially implements cache coherence by each node only caching locally-generated data within its associated memory. To this end, remotely-generated data (e.g., data generated by a target node) is acquired through performance of gets/sets. For example, a node initiating a "set" on a target process may cause a packet to propagate through the multi-node network 100 to a target node associated with the target process, and once received thereby, causes the target node to perform a write operation against a region of memory associated with the target process. On the other hand, a node initiating a "get" on a target process may cause the target node to read a region of memory associated with the target process and return a particular piece of data desired by the initiating node via the multi-node network 100. For the ease of description and practicality, this inter-process communication is generally referred to as inter-node communication herein.

Example Methodology and Architecture

Figure 3A:
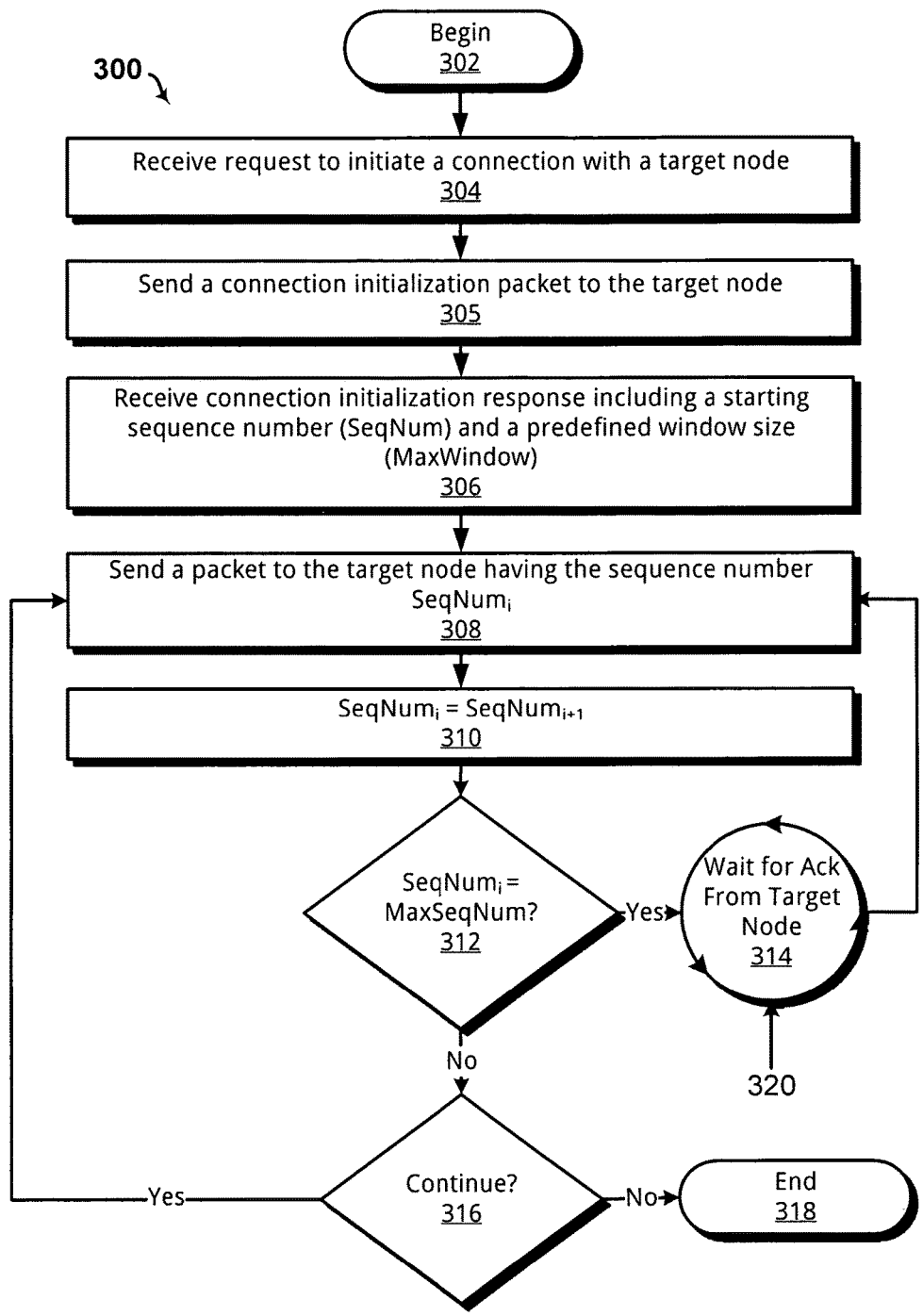
FIG. 3A shows an example method for initiating an end-to-end communication between an initiating node and a target node of the multi-node network of FIG. 1, in accordance with an embodiment of the present disclosure.

As previously discussed, an embodiment of the present disclosure includes a method for initiating communication between nodes of a multi-node network using a reliable, out-of-order, end-to-end protocol. One such example method 300 is shown in FIG. 3A, which illustrates a node initiating a connection request with a target node and sending a plurality of packets having a SeqNum$_i$ that are within a specific distance from the most furthest-along packet in the PSN space acknowledged by the target node. The example method 300 may be executed by a node, such as the node 102-X of FIG. 2, and in particular, by the network interface circuit 204-1 to 204-N of the node. However, as should be appreciated the method 300 may also be performed, in whole or in part, by the controller 206-1 to 206-N or other suitable controllers/circuits. As should be appreciated, the acts of method 300 may not necessarily be executed in the order given, and moreover, some acts may be omitted, added or otherwise augmented depending on a desired implementation. Method 300 begins in act 302.

In act 304, an initiating node receives a request to initiate a connection with a target node. In an embodiment, the request to initiate a connection request may be via, for instance, an application programming interface (API) using MPI, OpenSHMEM, or other suitable parallel application programming model. The request for may include, at least, a target logical process identifier or other suitable target identifier such as a node identifier that may be used to route packets to the target node.

In act 305, the initiating node may send a connection initialization packet to the target node via the multi-node network in order to initiate an end-to-end connection. The multi-node network 100 may then route the connection initialization packet to the target node. In act 306, the initiating node receives a connection initialization response packet that may include connection parameters defining a starting sequence number (SeqNum) and a window size (MaxWindow). These parameters may also be accurately referred to as connection baseline parameters. Alternatively, the SeqNum and MaxWindow may also be statically predefined within a memory of the initiating node. In addition, the SeqNum and MaxWindow may be set by the initiating node and provided to the target node within, for example, the connection initialization packet sent in act 305. In any event, the SeqNum and MaxWindow may then be utilized when sending a sequence of packets from the initiating node to the target node. As discussed below, the initiating node ensures that the present sequence number (e.g., $SeqNum_i$) does not exceed a maximum packet sequence number (MaxSeqNum), with the MaxSeqNum being calculated based on the sum of the MaxWindow and SeqNum parameters.

In act 308, the initiating node sends a packet to the target node having an assigned sequence number of $SeqNum_i$, wherein (i) is a non-negative number ($R \geq 0 = \{x \in R | x \geq 0\}$). In an embodiment, the initiating node sends the $SeqNum_i$ within a header portion of the packet and may be represented by, for example, a number of bytes (e.g., a 2, 4, or 8-byte value). In an embodiment, the packet may include an identifier of at least one memory operation (e.g., a get or set) and an optional data payload. In an embodiment, the assigned $SeqNum_i$ may be a discrete/unique number assigned from a range of sequence numbers starting at the starting sequence number (SeqNum) received in act 306, and consecutively incremented by at least one therefrom. As discussed below, the target node may provide a sequence number in a special acknowledgement packet to the initiating node. To this end, the sequence number received via a special acknowledgment packet may be utilized to derive a new MaxSeqNum for use in act 312, as discussed below, but does not necessarily change the sequence numbers assigned in act 308 as they may remain consecutively assigned from the starting sequence number determined in act 306.

In act 310, the initiating node increments $SeqNum_i$ ($SeqNum_i = SeqNum_{i+1}$). Note that the initiating node may increment the $SeqNum_i$ by more than one. In act 312, the initiating node compares $SeqNum_i$ to the maximum sequence number (MaxSeqNum) for a given window. In particular, and prior to receiving a special acknowledgement packet from the target node, the MaxSeqNum may be simply calculated as the sum of the SeqNum and MaxWindow parameters received in act 306. After receiving a special acknowledgement packet, the MaxSeqNum may be calculated based on the sum of the PSN of the contiguously received packet that is furthest along in the PSN space and a maximum window size (MaxWindow) contained within the special acknowledgement packet. However, as should be appreciated, the special acknowledgment packet may not necessarily contain a MaxWindow parameter, and in this instance, the target node may continue to use the Max Window received in act 306.

Some aspects of packet sequencing by an initiating node in accordance with the method 300 may be better understood by way of example. Consider if $SeqNum_i$ is presently equal to 9 and the MaxSeqNum presenting equals 14 based on, e.g., the PSN of the contiguously received packet that is furthest along in the PSN space being equal to 4 and the MaxWindow being equal to 10. In this instance, the initiating node continues sending packets as $SeqNum_i$ (9) is less than the MaxSeqNum (14). Conversely, if the $SeqNum_i$ is presently equal to 14 and the MaxSeqNum is presently equal to 14, the initiating node continues to act 314, and suspends packet transmission. As should be appreciated, this comparison ensures that the initiating node does not send a packet with a sequence number that exceeds a maximum sequence number expected by the target node, and thus may prevent a window overrun condition from occurring. In any event, if the $SeqNum_i$ equals the MaxSeqNum, the method 300 continues to act 314. Otherwise, the method 300 continues to act 316.

In act 314, the initiating node waits for a special acknowledgement packet 320 from the target node. As discussed further below with reference to FIG. 4, the target node may periodically send a special acknowledgement packet, with the special acknowledgement packet including the PSN of the contiguously received packet that is furthest along in the PSN space, and a maximum window size (MaxWindow). In response, the initiating node may set the Max Window to the maximum window size received in the special acknowledge if, for example, the previous MaxWindow is different from the newly received maximum window size. Likewise, the initiating node may then set the SeqNum to the PSN of the contiguously received packet that is furthest along in the PSN space such that a new MaxSeqNum is calculated during act 312.

Figure 3B:
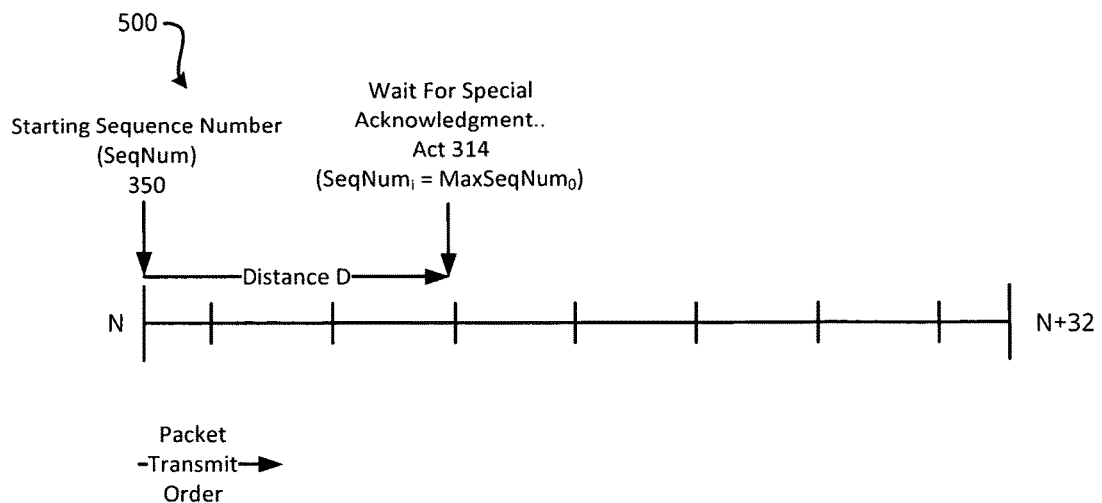
FIGS. 3B-3D show example packet transmission sequences transmitted by an initiating node during performance of the method of FIG. 3A, in accordance with some embodiments of the present disclosure.
Figure 3C:
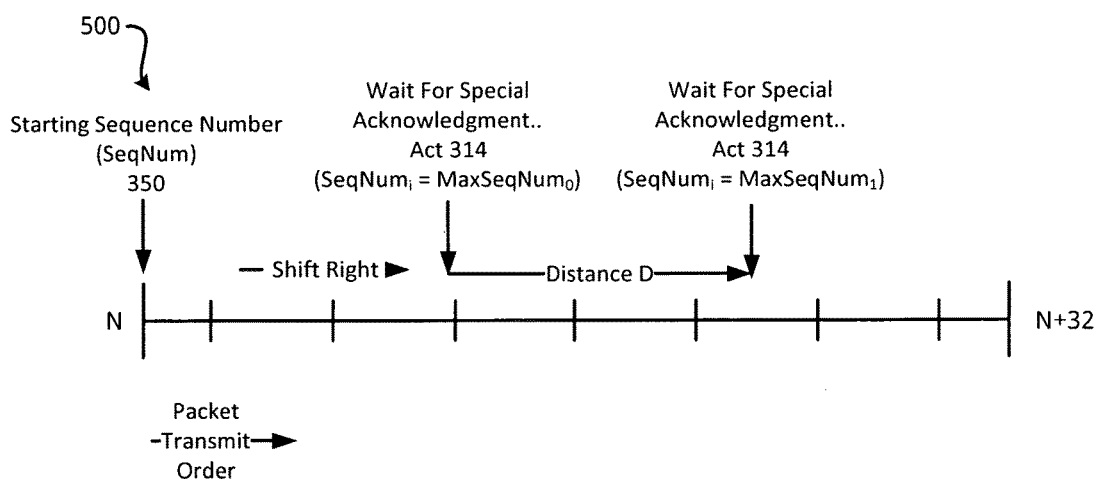

For example, as shown in FIG. 3B, an overall sequence of packets 500 or PSN space is represented in a left-to-right fashion wherein packet N on the left represents the start of packet transmission and N+32 on the right represents an end to the sequence of packets. As should be appreciated, a sequence of packets may exceed 32 packets, and the particular number shown is merely for practicality. As shown, the starting sequence number 350 may be set in accordance with the starting sequence number (SeqNum) determined in act 306, and the $MaxSeqNum_0$ may be calculated based on the sum of the starting sequence number 350 and the MaxWindow parameter determined in act 306. As further shown, the initiating node sends a sequence of packets with corresponding sequence numbers ($SeqNum_i$) up to but not exceeding the $MaxSeqNum_0$, with distance D representing a maximum window size defined by the sum of the SeqNum 350 and the MaxWindowSize parameter. Once the node reaches the $MaxSeqNum_0$, the node may wait for a special acknowledgment packet from the target node (e.g., act 314) prior to transmitting additional packets. Once the initiating node receives the special acknowledgment packet, and as shown in FIG. 3C, the sequence number of the contiguously received packet that is furthest in the PSN space and the MaxWindow parameter received therein may be used to "shift" the initiating node's window to the right. For example, and as further shown, the initiating node may resume transmitting packets up to the new the $MaxSeqNum_1$, which may be calculated based on the sum of the sequence number of the contiguously received packet that is furthest in the PSN space provided within the received special acknowledgement packet and the MaxWindow parameter.

Figure 3D:
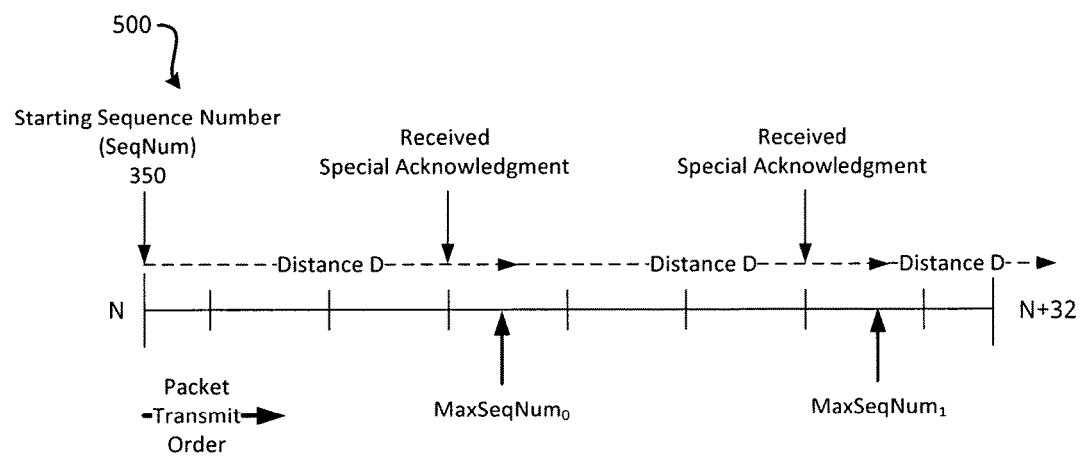

In an embodiment, and as discussed in further detail below with regard to the method 800 of FIG. 8, the initiating node may receive a periodic special acknowledgement packet from the target node prior to act 314. The particular frequency a target node transmits a special acknowledgement packet is discussed in greater detail below with reference to FIG. 4. As shown in FIG. 3D, the initiating node may receive a special acknowledgement packet before having fully transmitted an entire sequence of packets up to $MaxSeqNum_0$, for example. In addition, and subsequently, the initiating node may receive yet another special acknowledgment packet prior to transmitting an entire sequence of packets up to $MaxSeqNum_1$. Thus, in this example, the distance D may be continuously extended such that the initiator performs acts 308 to 312 without having to suspend packet transmissions temporarily in act 314. Stated differently, the reception of a special acknowledgement packet in this context results in the initiating node resetting SeqNum and MaxWindow such that acts 308 to 312 may be performed in a continuous fashion without SeqNum$_i$ reaching a current MaxSeqNum value. Thus the special acknowledgement packet 320 received in act 314, or otherwise received during performance of the method 300, may be understood as a cumulative acknowledgement that enables the initiating node to determine a range of packets were successfully received by the target node, and that a window may be "shifted" or otherwise moved to send additional packets. As should be appreciated in light of this disclosure, this may allow a high rate of packets to be reliably transmitted by the initiating node to the target node without the initiating node tracking packet transmission states at a fine-grain level.

Returning to FIG. 3A, and in act 316, the initiating node determines if additional packets should be transmitted to the target node. For example, the initiating node may have N number of additional packets within a given PSN space to send to the target node. In some cases, the initiating node holds a connection open indefinitely in the event a process/node seeks to transmit additional packets to the target node sporadically. If the initiating node determines the connection should be closed, the method ends in act 318. Otherwise, the method 300 returns to act 308 and the initiating node continues to perform acts 308-316 to transmit additional packets to the target node.

Figure 8:
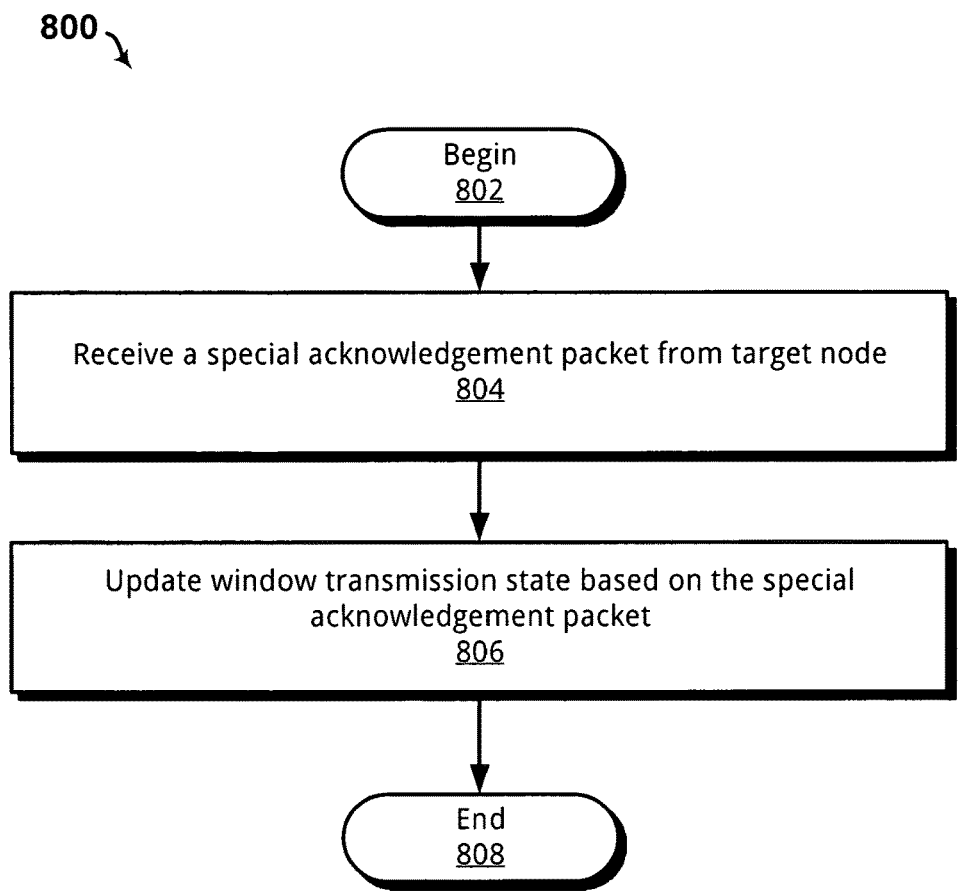
FIG. 8 shows an example method for receiving periodic special acknowledgement packets from a target node, in accordance with an embodiment of the present disclosure.

Referring now to FIG. 8, an example method for receiving a special acknowledgement packet is shown in accordance with an embodiment of the present disclosure. An initiating node may periodically receive a special acknowledgment packet from a target node during performance of the example method 300. The particular frequency of special acknowledgement packets sent by a target node is discussed in greater detail below with reference to FIG. 4. In a general sense, the target node uses special acknowledgement packets to cumulatively inform an initiating node that one or more packets was successfully received, and that the one or more packets represent the furthest contiguous received packet sequence numbers within an overall PSN space. Thus special acknowledgment packets may be sent at a frequency of one (1), whereby each received packet having a sequence number that is the furthest contiguous sequence number within the PSN space causes the target node to transmit a special acknowledgement packet. As should be appreciated, the particular frequency chosen may be greater than one to increase packet throughput. In any event, the initiating node may thus update its own packet transmission window in a cumulative fashion using a received special acknowledgment packet versus independently tracking whether each individual packet was received and acknowledged by the target node. The method 800 includes acts of receiving a special acknowledgement packet from a target node, and updating a window transmission state based on the special acknowledgement packet. The method 800 begins in act 802.

In act 804, the initiating node receives a special acknowledgement packet from a target node. The special acknowledgement packet may provide the PSN of the contiguously received packet that is furthest along in the PSN space. In addition, and in accordance with an embodiment, the special acknowledgement packet may include a parameter that provides a new maximum window (MaxWindow) value, with the new MaxWindow value being different than the MaxWindow parameter received in act 306 of FIG. 3A.

In act 806, the initiating node updates a window transmission state based on the special acknowledgement packet. In some cases, the PSN of the contiguously received packet that is furthest along in the PSN space allows the initiating node to determine an entire window of packets, or at least a contiguous portion thereof, was successfully received by the target node. Thus the target node may set the SeqNum parameter used in method 300 to the PSN of the contiguously received packet that is furthest along in the PSN space received in the special acknowledgment. Likewise, the MaxWindow parameter used in method 300 may be set to the maximum window size received in the special acknowledgment packet. For example, the maximum window size received in the special acknowledgement packet may be a different size then the current MaxWindow. In this example, the initiating node adjusts its window size (e.g., the distance D), and by extension, the current MaxSeqNum, accordingly. In any event, the initiating node may use the PSN of the contiguously received packet that is furthest along in the PSN space that was provided within the special acknowledgement packet as a new starting sequence number (SeqNum) for a current window, which may then be used during performance of acts 308-312 of the method 300, and more particularly when calculating the MaxSeqNum in act 312. However, and as should be appreciated, the sequence number received via a special acknowledgment packet does not necessarily change the sequence numbers assigned to packets in act 308 as they may remain consecutively assigned or otherwise incremented from the starting sequence number first determined in act 306. As discussed above with reference to FIG. 3A and FIG. 3D, this may result in the initiating node continuously sending a stream of packets without entering act 314 and suspending packet transmission. The method 800 ends in act 808.

Figure 4:
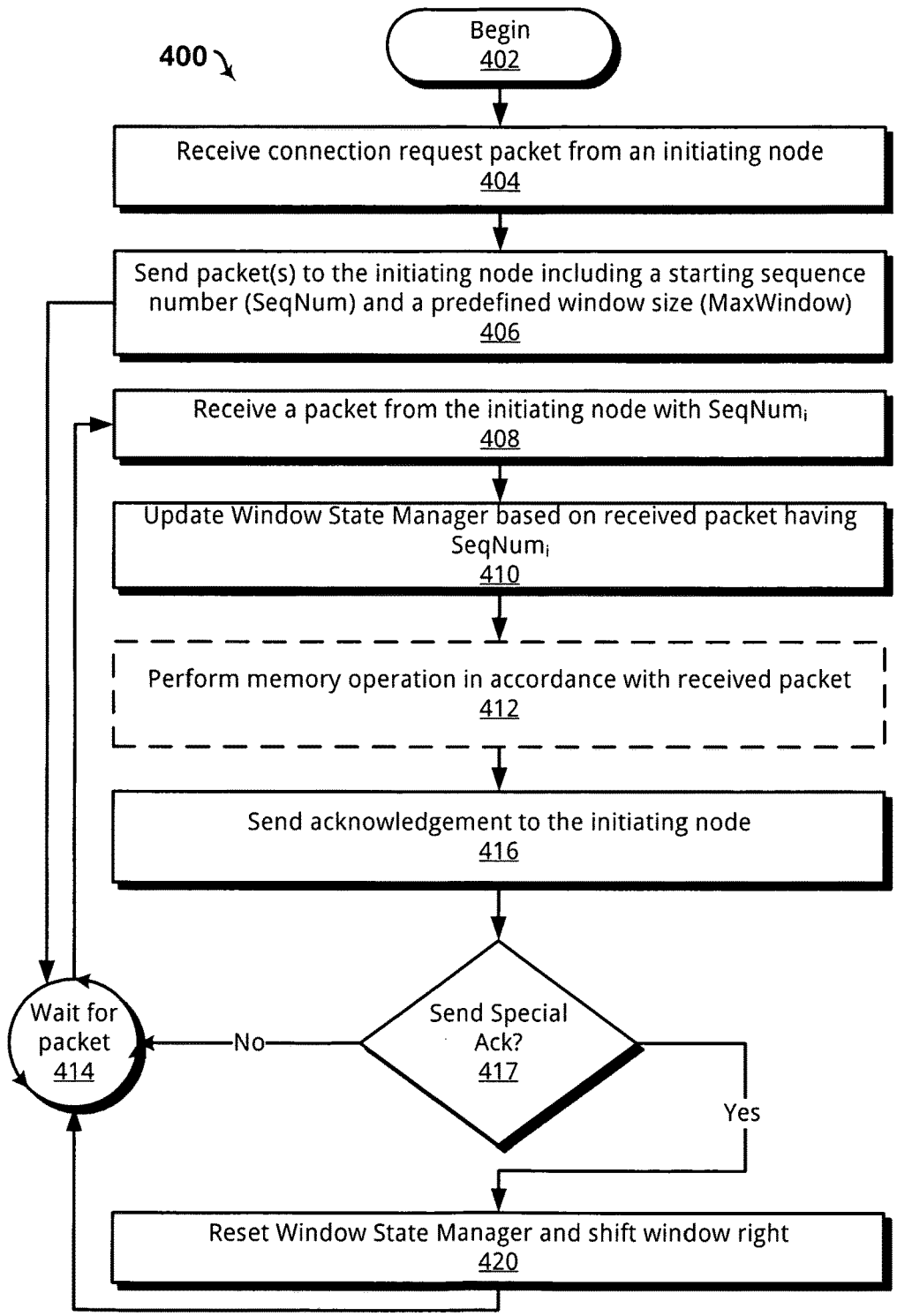
FIG. 4 shows an example method for servicing an end-to-end communication request from an initiating node and maintaining a window state manager to account for out-of-order packets received during the end-to-end communication, in accordance with an embodiment of the present disclosure.

Referring now to FIG. 4, an example method 400 for servicing an end-to-end communication request from an initiating node and maintaining a window state manager to account for out-of-order packets received during end-to-end communication is shown, in accordance with an embodiment of the present disclosure. The example method 400 may be executed by a node such as the node 102-X of FIG. 2, and in particular, by the network interface circuit 204-1 to 204-N of the node. However, as should be appreciated the method 400 may also be performed, in whole or in part, by the controller 206-1 to 206-N or other suitable controllers/circuits. As should be appreciated, the acts of method 400 may not necessarily be executed in the order given, and moreover, some acts may be omitted, added or otherwise augmented depending on a desired implementation. Method 400 begins in act 402.

In act 404, a target node receives a connection request packet from a remote (initiating) node of the multi-node network 100. As previously discussed, the connection request packet transmitted by the initiating node may be implemented in accordance with a programming model such as MPI or OpenSHMEM, for example.

In act 406, the target node responds to the initiating node by sending one or more packets that include a starting sequence number (SeqNum) and a predefined window size (MaxWindow). As previously discussed, the SeqNum establishes a starting sequence number, and the MaxWindow establishes the maximum distance from that starting sequence number. The method 400 then continues to act 414, and the target node waits to receive a packet from the initiating node.

In act 408, the target node receives a packet from the initiating node with SeqNum$_i$, which at the start of a sequence of received packets may equal the starting sequence number (SeqNum) sent to the target node in act

406. However, given that adaptive routing capabilities of the multi-node network 100, packets may get substantially reordered (e.g., last packet sent may be the first received), and therefore, there is no guarantee as to which packet in the sequence the target node receives first.

Figure 5:
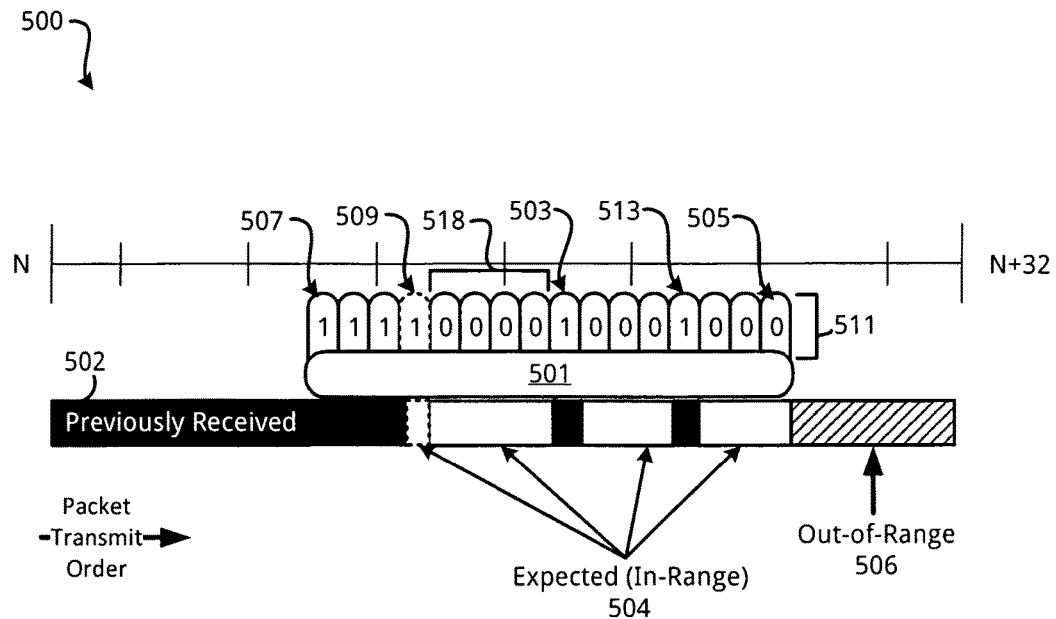
FIG. 5 illustrates an example packet transmission sequence and a window state manager for tracking packet transmission states during performance of the method of FIG. 4, in accordance with an embodiment of the present disclosure.

In act 410, the target node updates a window state manager 501 based on the received packet having sequence number $SeqNum_i$. For example, and as shown in FIG. 5, the window state manager 501 may manage a window that tracks a finite number of contiguous packets within a PSN space 500. The window state manager 501 may be stored in a register or other suitable memory of the target node. The window state manager 501 visually resembles a sports scoreboard, and thus, may also be accurately referred to as a window scoreboard. As shown, an overall sequence of packets 500 or PSN space is represented in a left-to-right fashion wherein packet N on the left represents the start of packet transmission and N+32 on the right represents an end to the sequence of packets. As should be appreciated, a sequence of packets may exceed 32 packets, and the particular number shown is merely for practicality. The previously received packets 502 represent packets that were previously received and acknowledged by the target node. In addition, the previously received packets 502 may represent one or more memory operations that were previously performed. For example, the memory operations may include previously applied atomic operations. The window state manager 501 may be logically aligned with PSN space 500 such that a plurality of packet positions 511 or index numbers generally align with a subset of respective sequence numbers consecutively ordered within the PSN space 500. The window state manager 501 may represent N number of packets and can include a starting index at 507 and an ending index at 503. Each position/index may indicate receipt of a represented packet with a "1" and a non-received packet with a "0".

Thus, in act 410, the target node may then compare the sequence number $SeqNum_i$ of the packet received in act 408 against the window state manager 501. If the index corresponding to the sequence number $SeqNum_i$ of the received packet is already set to 1, then the target node identifies the received packet is a duplicate and ignores or otherwise discards it. Otherwise, the target node may flip the bit of the corresponding index to mark the packet as received. In act 412, the target node may perform one or more memory operations associated with the received packet. In an embodiment, the memory operations are designed to read or write to user-space memory. The user-space memory may be utilized, for example, during execution of a process that is associated with a parallel application deployed/allocated within the multi-node network 100.

However, recall that the multi-node network 100 may support adaptive routing which can cause out-of-order delivery to occur. Thus some out-of-order packets may be received and acknowledged by the target node flipping a bit (e.g., from 0 to 1). For instance, as shown, six (6) of the packets within the expected range 504 have been acknowledged (e.g., received=1) while ten (10) packets have yet to be received (e.g., received=0). Within those received packets, two have been received out-of-order (e.g., packets 505 and 513). The memory operations associated with those out-of-order received packets may be delayed until all packets to the left (e.g., having earlier sequence numbers) have been received, or they may be immediately applied. Note that packets beyond the expected region 504 are considered to be within an out-of-range portion 506. Thus if the target node receives packets with a sequence number that exceeds the window size (e.g., within the out-of-range portion 506) of the window state manager 501, the target node may send a negative acknowledgement packet to the initiating node.

While the window state manager 501 shown in FIG. 5 is configured with a 16-packet configuration, other window sizes are also within the scope of this disclosure and may vary depending on a desired configuration. For example, and in accordance with an embodiment, the window state manager 501 may be configured to track at least 1000 packets within a given PSN space.

Returning to FIG. 4, and in act 416, the target node sends an acknowledgement packet to the initiating node. In some cases, the initiating node may simply send a response packet to the initiating node that identifies the packet as an acknowledgement, and may also provide the sequence number $SeqNum_i$ corresponding to the packet received in act 408. As should be appreciated in light of this disclosure, the acknowledgement packet may be relatively small in size, thus limiting the amount of data transmitted over the multi-node network 100.

In act 417, the target node may transmit a special acknowledgement packet including the PSN of the contiguously received packet that is furthest along in the PSN space. In accordance with an embodiment, the node may periodically send a special acknowledgement packet. In some cases, the special acknowledgement packet may be sent at a predefined frequency N, with N being defined as any positive whole number that MaxWindow may be divided by without a remainder (e.g., MaxWindow % N=0). For example, in a 16 packet window, the target node may send a special acknowledgement packet once for every four (4) contiguous packets received (e.g., frequency N=4) relative to the starting index 507. In other cases, the predefined frequency N may be any positive whole number less than or equal to MaxWindow.

For example, and referring again to FIG. 5, three of the first four packets were registered as received (e.g., received=1). The target node may, in response to a last packet within that range being received (e.g., packet 509), and therefore completing the set, may send a special acknowledgement packet that includes the $SeqNum_i=4$ (or 3 in a zero-base scheme), which is the furthest contiguously received sequence number in the PSN space 500. Thus the sequence number corresponding to packet 509 may be transmitted within the special acknowledgement packet (e.g., if frequency N is 4). As should be appreciated, the packet 509 is "furthest" along in the PSN space 500 because each packet index starting at index 0 (e.g., shown at 507), or the first index, of the window state manager 501 up to the index representing packet 509 was indicated as received. The particular frequency N may also be understood as the minimum number of packets received within a given consecutive set relative to the starting index 507 before a special acknowledgment is sent.

Figure 7:
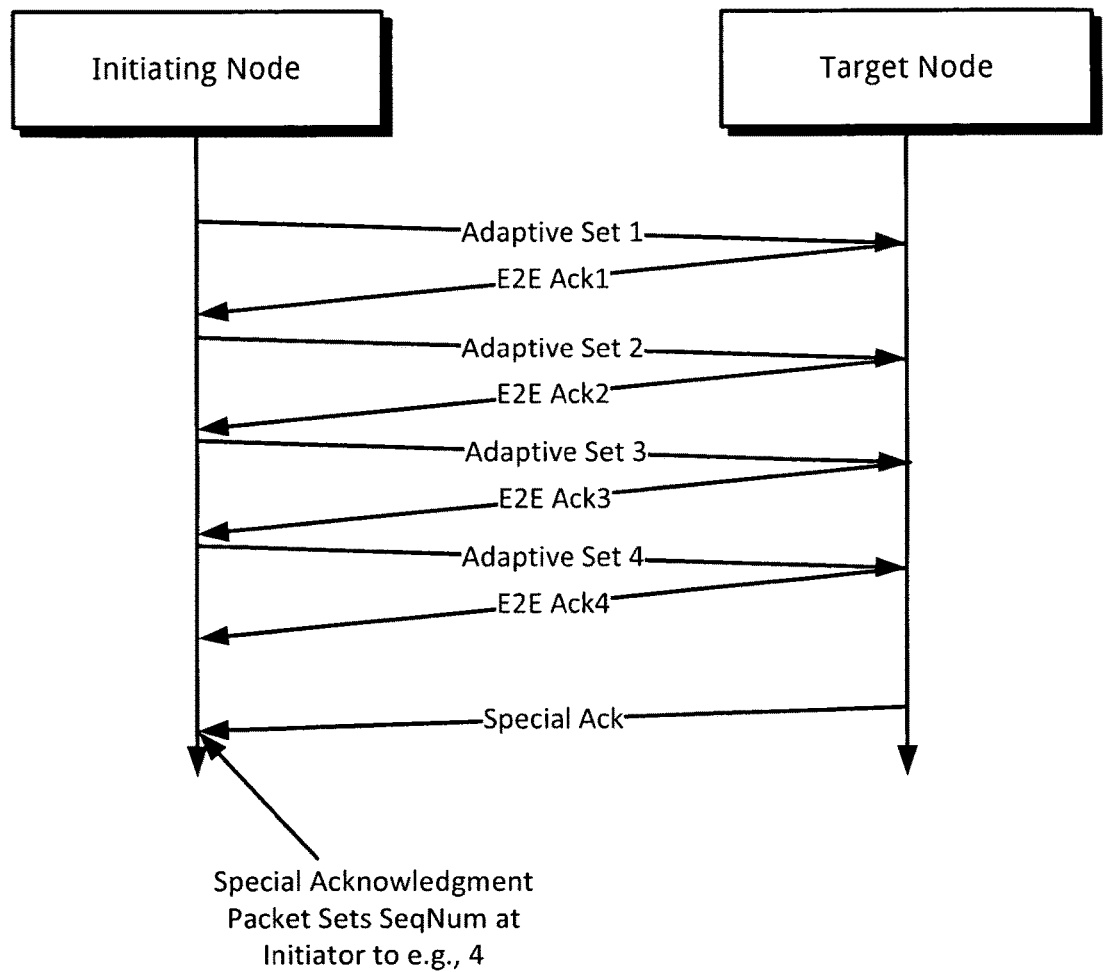
FIG. 7 illustrates an example end-to-end protocol flow between an initiating node and a target node, in accordance with an embodiment of the present disclosure.

FIG. 7 shows an example protocol flow and illustrates aspects of the special acknowledgement packets in further detail. As shown, a special acknowledgement packet is sent at a frequency N=4. In more detail, the initiating node transmits a plurality of packets which are adaptively routed to the target node. In response, the target node sends end-to-end (E2E) acknowledgments back to the initiating node. In addition, based on frequency N=4, the target node transmits a special acknowledgement to the initiating node. The special acknowledgement may identify the sequence number of, for example, the packet 509, which is the furthest along in the PSN space 500. In this instance, the sequence number may be equal to 4, thus causing the initiating node to set the SeqNum to 4 for use when calculating a MaxSeqNum during the method 300 of FIG. 3.

Continuing with FIG. 5, and the example where frequency N=4, after the target node successfully receives packets 5 . . . 8 (e.g., the set generally indicated at 518), the target node may send yet another special acknowledgement packet with $SeqNum_i=8$. Thus the target node may perform packet transmission state tracking for a finite number of packets within the PSN space 500 via the window state manager 501, and may provide a periodic indication of the state of the same via special acknowledgement packets after receiving a full set of consecutively numbered packets relative to the starting packet index 507. So the initiating node may receive the special acknowledgement packets, with each special acknowledgement packet providing a cumulative update for a current window. As should be appreciated, this cumulative update may allow the initiating node to perform coarse-grain state tracking and avoid the expense of tracking the transmission state of each individual packet. The specific example frequency discussed above is not intended to limit the present disclosure, and numerous other frequency values are within the scope of this disclosure and may be chosen based on a desired implementation.

Alternatively, or in addition to a particular frequency N, the target node may periodically transmit the special acknowledgement packet at a particular interval, even without receiving one or more contiguous packets having sequence numbers furthest within the PSN space. This may allow the initiating node to identify, for example, one or more packets have yet to be received and have stalled the target node from advancing past a particular packet position within the window. For example, the regular interval may be configurable and may be based on a timer implemented using a hardware or software clock of a node. In some cases, the timer is configured with an interval of at least five (5) seconds such that after the timer elapses a special acknowledgement packet is sent. However, other timeouts/intervals for the timer are also within the scope of this disclosure.

In any event, returning to FIG. 4 and in act 417, the method continues to act 420 if a special acknowledgement packet was sent and the window was shifted to the right accordingly. Otherwise, the method 400 returns to act 414 and waits for an additional packet within the current window from the initiating node.

Figure 6:
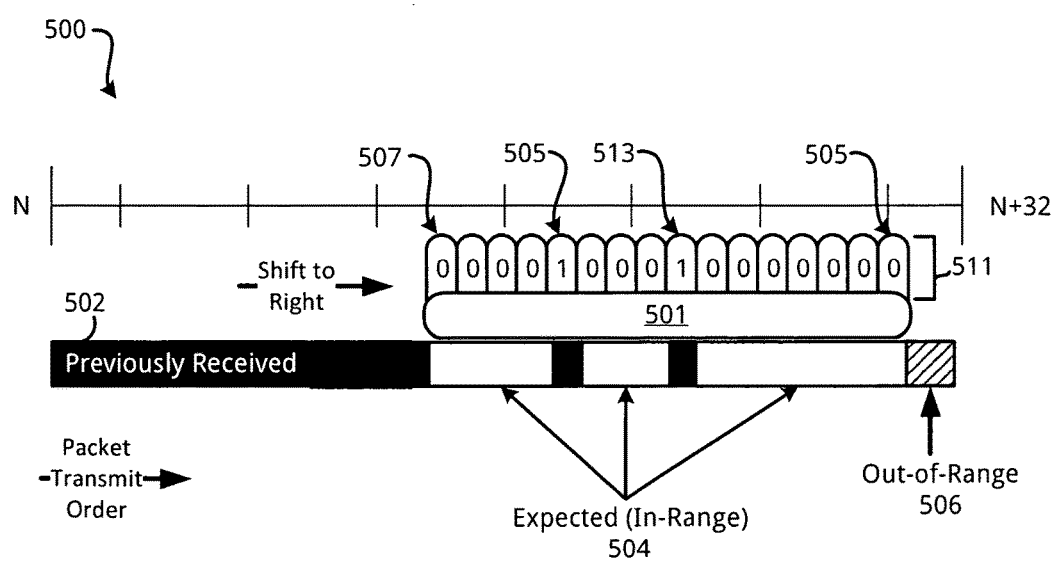
FIG. 6 illustrates the example packet transmission sequence of FIG. 5 with the window state manager shifted to the right to account for additional packets received during end-to-end communication, in accordance with an embodiment of the present disclosure.

In act 420, the target node resets the window state manager 501 and shifts the window the right. For example, and as shown in FIG. 6, the window state manager 501 is shifted to the right by four (4) such that at least a portion of the previous out-of-range region 506 of the packet sequence 500 is now within the in-range region 504. The particular number shifted to the right may be relative to the range of contiguously received packets furthest in the PSN space 500 which was reported to the initiating node via special acknowledgement packet sent in act 417. Accordingly, the index positions corresponding to previously received packets 505 and 513 shifts an equal number to the left such that packets 505 and 513 in the window state manager 501 of FIG. 6 register as received (e.g., received=1). As should be appreciated, and as shown, this causes the first index 507 to logically align with a sequence number beyond packet 509, which in this illustration is the packet sequence number corresponding to the first packet of set 518. The remaining packet indexes may then be zeroed out, for instance, by flipping any packet index having a one to a zero. The method 400 may continue to perform acts 408 to 420 until the initiating/target node ends the connection, for example.

Example System

FIG. 9 illustrates a computing system 900 configured to perform various processes disclosed herein. For example, system 900 may be incorporated into a personal computer (PC), laptop computer, wearable computing device, ultralaptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 900 comprises a platform 902 coupled to a display 920. Platform 902 may receive content from a content device such as content services device(s) 930 or content delivery device(s) 940 or other similar content sources. A navigation controller 950 comprising one or more navigation features may be used to interact with, for example, platform 902 and/or display 920, so as to supplement navigational gesturing by the user. Each of these example components is described in more detail below.

In some embodiments, platform 902 may comprise any combination of a chipset 905, processor 910, memory 912, storage 914, graphics subsystem 915, camera 919, motion sensors 921, applications 916 and/or radio 918 or wireless transceiver circuit. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 910 may comprise dual-core processor(s), dual-core mobile processor(s), and so forth. Memory 912 may be implemented, for instance, as a volatile memory device such as, but not limited to, a Random Access Memory (RAM), Dynamic Random Access Memory (DRAM), or Static RAM (SRAM). Storage 914 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 914 may comprise technology to increase the storage performance enhanced protection for valuable digital media when multiple hard drives are included, for example.

Graphics subsystem 915 may perform processing of images such as still or video for display, and in some embodiments is configured to synthesize face images, as variously described herein. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 could be integrated into processor 910 or chipset 905. Graphics subsystem 915 could be a stand-alone card communicatively coupled to chipset 905.

The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 918 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In some embodiments, content services device(s) 930 may be hosted by any national, international and/or independent service and thus accessible to platform 902 via the Internet or other network, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920. In some embodiments, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, graphics, text, medical and gaming content, and so forth.

Content services device(s) 930 receives content such as cable television programming including media information, digital information, and/or other content. Examples of content providers may include any cable or satellite television or radio or Internet content providers. The provided examples are not meant to limit the present disclosure. In some embodiments, platform 902 may receive control signals from navigation controller 950 having one or more navigation features. The navigation features of controller 950 may be used to interact with user interface 922, for example. In some embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 950 may be echoed on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In some embodiments, controller 950 may not be a separate component but integrated into platform 902 and/or display 920. Embodiments, however, are not limited to the elements or in the context shown or described herein, as will be appreciated.

In some embodiments, drivers (not shown) may comprise technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 when the platform is turned "off." In addition, chipset 905 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 9.

As described above, system 900 may be embodied in varying physical styles or form factors. FIG. 9 illustrates embodiments of a small form factor device 900 in which system 900 may be embodied. In some embodiments, for example, device 900 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, mobile electronic device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device, which in one example embodiment is a touchpad display. I/O device 906 may comprise any suitable I/O device for entering information into a mobile computing device. Examples for I/O device 906 may include an alphanumeric keyboard, a numeric keypad, a touch pad, input keys, buttons, a camera, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 discloses a method for performing inter-process communication between nodes of a multi-node system, the method comprising defining, by a circuit, a window that represents a range of consecutively numbered packets, the window having a starting index number corresponding to the first packet of the range, receiving, by the circuit, a plurality of packets from a remote node, each received packet having a unique sequence number, determining, by the circuit, receipt of a consecutive set of received packets within the range of consecutively numbered packets, wherein the consecutive set of received packets has consecutive sequence numbers, and a first packet of the consecutive set has a sequence number corresponding to the starting index number of the window, and transmitting, to the remote node by the circuit, an indication in response to determining receipt of the consecutive set of received packets.

Example 2 includes the subject matter of Example 1, wherein the indication comprises a special acknowledgement packet, the special acknowledgment packet including a sequence number corresponding to the last packet of the consecutive set of received packets within the range.

Example 3 includes the subject matter of any one of Examples 1-2, wherein the special acknowledgement packet is transmitted periodically to the remote node based on a timer.

Example 4 includes the subject matter of any one of Examples 1-3, further comprising in response to determining receipt of the consecutive set of received packets, shifting the window such that the starting index number of the window corresponds to a packet associated with a sequence number beyond the last packet of the consecutive set.

Example 5 includes the subject matter of any one of Examples 1-4, wherein a packet of the received plurality of packets comprises at least one memory operation, and wherein the method further comprises causing the at least one memory operation to be performed against a region of a memory.

Example 6 includes the subject matter of Example 5, wherein the region of the memory comprises user-space memory.

Example 7 includes the subject matter of any one of Examples 5-6, wherein the at least one memory operation includes an atomic operation.

Example 8 includes the subject matter of any one of Examples 1-7, further comprising receiving, by a circuit, a connection initialization packet from the remote node, and sending, by the circuit, a response packet to the remote node including a maximum window size associated the window and a starting sequence number.

Example 9 includes the subject matter Example 8, wherein the response packet is configured to cause the remote node to assign sequence numbers to the plurality of packets sent therefrom with a starting sequence number set to the starting sequence number included in the response packet, and to cause the remote node to suspend transmitting packets before transmitting a packet with a sequence number that is equal to a max sequence number, the max sequence number being calculated as a sum of the starting sequence number and the maximum window size.

Example 10 includes the subject matter of Example 8, wherein the window size is at least 1000 packets.

Example 11 includes the subject matter of any one of Examples 1-10, wherein determining receipt of the consecutive set of received packets within the range further comprises determining the consecutive set includes a minimum number of packets.

Example 12 includes the subject matter of Example 11, wherein the minimum number of packets is a number less than a total number of consecutive packets represented by the window.

Example 13 includes the subject matter of any one of Examples 1-12, wherein the circuit is integrated into a fabric interface circuit.

Example 14 discloses a method for sending a plurality of packets between nodes of a multi-node system, the method comprising transmitting, by a circuit, a connection request to a target node of the multi-node system, receiving, by the circuit, a connection request response packet from the target node, the connection request response packet including a maximum window size, determining, by the circuit, a starting index number, and transmitting, to the target node by the circuit, a first sequence of consecutively numbered packets, the first sequence of consecutively numbered packets having sequence numbers starting at the starting index number and ending at a maximum sequence number, the maximum sequence number being calculated based on a sum of the starting index number and the maximum window size.

Example 15 includes the subject matter of Example 14, further comprising receiving a special acknowledgement packet from the target node comprising a new starting sequence number.

Example 16 includes the subject matter of Example 15, further comprising transmitting, by the circuit to the target node, a second sequence of consecutively numbered packets, the second sequence the consecutively numbered packets having sequence numbers starting after the new starting sequence number and ending at a maximum sequence number, the maximum sequence number being calculated based on a sum of the new starting sequence number and the maximum window size.

Example 17 discloses a system comprising a first node device comprising a memory, circuitry configured to be communicatively coupled to a multi-node network, the circuitry being configured to define a window that represents a range of consecutively numbered packets, the window having a starting index number corresponding to the first packet of the range, receive a plurality of packets from a remote node, each received packet having a unique sequence number, determine receipt of a consecutive set of received packets within the range of consecutively numbered packets, wherein the consecutive set of received packets has consecutive sequence numbers, and a first packet of the consecutive set has a sequence number corresponding to the starting index number of the window, and transmit to the remote node an indication in response to determining receipt of the consecutive set of received packets.

Example 18 includes the subject matter Example 17, wherein the indication comprises a special acknowledgement packet, the special acknowledgment packet including a sequence number corresponding to the last packet of the consecutive set of received packets within the range.

Example 19 includes the subject matter of any one of Examples 17-18, wherein the circuitry of the first node device is further configured to in response to determining receipt of the consecutive set of received packets, shift the window such that the starting index number of the window corresponds to a packet associated with a sequence number beyond the last packet of the consecutive set.

Example 20 includes the subject matter of any one of Examples 17-19, wherein the circuitry of the first node device comprises a network interface circuit.

Example 21 includes the subject matter of any one of Examples 17-20, wherein the circuitry of the first node device is further configured to receive a connection initialization packet from the remote node, and transmit a response packet to the remote node including a maximum window size and a starting sequence number.

Example 22 discloses a node device comprising a memory, a network interface circuit to communicate on a multi-node network and to receive a plurality of packets from a remote node, each received packet having a unique sequence number, means for defining a window that represents a range of consecutively numbered packets, the window having a starting index number corresponding to the first packet of the range, means for determining receipt of a consecutive set of received packets within the range of consecutively numbered packets, wherein the consecutive set of received packets has consecutive sequence numbers, and a first packet of the consecutive set has a sequence number corresponding to the starting index number of the window, and means for shifting the window such that the starting index number of the window corresponds to a packet associated with a sequence number beyond the last packet of the consecutive set in response to determining receipt of the consecutive set of received packets.

Example 23 includes the subject matter of Example 22, wherein the network interface circuit is further configured to transmit an indication to a remote node in response to determining receipt of the consecutive set of received packets.

Example 24 includes the subject matter of Example 23, wherein the indication comprises a special acknowledgement packet, the special acknowledgment packet including a sequence number corresponding to the last packet of the consecutive set of received packets within the range.

Example 25 includes the subject matter of any one of Examples 22-24, wherein the network interface circuit is further configured to receive a connection initialization packet from the remote node, and transmit a response packet to the remote node including a maximum window size and a starting sequence number.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for performing inter-process communication between nodes of a multi-node system, the method comprising:
    defining, by a circuit, a window that represents a range of consecutively numbered packets, the window having a starting index number corresponding to the first packet of the range;
    receiving, by the circuit, a connection initialization packet from a remote node;
    sending, by the circuit, a response packet to the remote node including a maximum window size associated the window and a starting sequence number, wherein the response packet is configured to cause the remote node to assign sequence numbers to the plurality of packets sent therefrom with a starting sequence number set to the starting sequence number included in the response packet;
    receiving, by the circuit, a plurality of packets from the remote node, each received packet having a unique sequence number;
    determining, by the circuit, receipt of a consecutive set of received packets within the range of consecutively numbered packets, wherein the consecutive set of received packets has consecutive sequence numbers, and a first packet of the consecutive set has a sequence number corresponding to the starting index number of the window;
    causing, by the circuit, the remote node to suspend transmitting packets before transmitting a packet with a sequence number that is equal to a max sequence number, the max sequence number being calculated as a sum of the starting sequence number and the maximum window size; and
    transmitting, to the remote node by the circuit, an indication in response to determining receipt of the consecutive set of received packets.

2. The method of claim 1, wherein the indication comprises a special acknowledgement packet, the special acknowledgment packet including a sequence number corresponding to the last packet of the consecutive set of received packets within the range.

3. The method of claim 2, wherein the special acknowledgement packet is transmitted periodically to the remote node based on a timer.

4. The method of claim 1, further comprising:
    in response to determining receipt of the consecutive set of received packets, shifting the window such that the starting index number of the window corresponds to a packet associated with a sequence number beyond the last packet of the consecutive set.

5. The method of claim 1, wherein a packet of the received plurality of packets comprises at least one memory operation, and wherein the method further comprises causing the at least one memory operation to be performed against a region of a memory.

6. The method of claim 5, wherein the region of the memory comprises user-space memory.

7. The method of claim 5, wherein the at least one memory operation includes an atomic operation.

8. The method of claim 1, wherein the window size is at least 1000 packets.

9. The method of claim 1, wherein determining receipt of the consecutive set of received packets within the range further comprises determining the consecutive set includes a minimum number of packets.

10. The method of claim 9, wherein the minimum number of packets is a number less than a total number of consecutive packets represented by the window.

11. The method of claim 1, wherein the circuit is integrated into a fabric interface circuit.

12. A system comprising:
    a first node device comprising:
        a memory;
        circuitry configured to be communicatively coupled to a multi-node network, the circuitry being configured to:
            define a window that represents a range of consecutively numbered packets, the window having a starting index number corresponding to the first packet of the range;
            receive a connection initialization packet from a remote node;
            transmit a response packet to the remote node including a maximum window size and a starting sequence number;
            receive a plurality of packets from the remote node, each received packet having a unique sequence number;
            determine receipt of a consecutive set of received packets within the range of consecutively numbered packets, wherein the consecutive set of received packets has consecutive sequence numbers, and a first packet of the consecutive set has a sequence number corresponding to the starting index number of the window;
            suspend transmitting packets before transmitting a packet with a sequence number that is equal to a max sequence number, the max sequence number being calculated as a sum of the starting sequence number and the maximum window size; and
            transmit to the remote node an indication in response to determining receipt of the consecutive set of received packets.

13. The system of claim 12, wherein the indication comprises a special acknowledgement packet, the special acknowledgment packet including a sequence number corresponding to the last packet of the consecutive set of received packets within the range.

14. The system of claim 12, wherein the circuitry of the first node device is further configured to:
in response to determining receipt of the consecutive set of received packets, shift the window such that the starting index number of the window corresponds to a packet associated with a sequence number beyond the last packet of the consecutive set.

15. The system of claim 12, wherein the circuitry of the first node device comprises a network interface circuit.

16. A node device comprising:
a memory;
a network interface circuit to communicate on a multi-node network and to receive a plurality of packets from a remote node, each received packet having a unique sequence number;
means for defining a window that represents a range of consecutively numbered packets, the window having a starting index number corresponding to the first packet of the range;
means for receiving a connection initialization packet from the remote node;
means for transmitting a response packet to the remote node including a maximum window size and a starting sequence number;
means for determining receipt of a consecutive set of received packets within the range of consecutively numbered packets, wherein the consecutive set of received packets has consecutive sequence numbers, and a first packet of the consecutive set has a sequence number corresponding to the starting index number of the window;
means for suspending transmitting packets before transmitting a packet with a sequence number that is equal to a max sequence number, the max sequence number being calculated as a sum of the starting sequence number and the maximum window size; and
means for shifting the window such that the starting index number of the window corresponds to a packet associated with a sequence number beyond the last packet of the consecutive set in response to determining receipt of the consecutive set of received packets.

17. The node device of claim 16, wherein the network interface circuit is further configured to transmit an indication to a remote node in response to determining receipt of the consecutive set of received packets.

18. The node device of claim 16, wherein the indication comprises a special acknowledgement packet, the special acknowledgment packet including a sequence number corresponding to the last packet of the consecutive set of received packets within the range.

* * * * *